United States Patent
Ewen, III et al.

(10) Patent No.: US 9,664,336 B2
(45) Date of Patent: *May 30, 2017

(54) APPARATUS, SYSTEM AND METHOD FOR SECURING, ATTACHING AND/OR DETACHING A DEVICE TO A FIXTURE

(71) Applicant: Sennco Solutions, Inc., Plainfield, IL (US)

(72) Inventors: John E. Ewen, III, Aurora, IL (US); Andy G. Reynolds, Aurora, IL (US); James Groth, Poplar Grove, IL (US)

(73) Assignee: Sennco Solutions, Inc., Plainfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/051,802

(22) Filed: Feb. 24, 2016

(65) Prior Publication Data

US 2016/0169445 A1 Jun. 16, 2016

Related U.S. Application Data

(62) Division of application No. 13/600,047, filed on Aug. 30, 2012, now Pat. No. 9,303,809.

(51) Int. Cl.
*F16M 13/00* (2006.01)
*F16M 13/02* (2006.01)
(Continued)

(52) U.S. Cl.
CPC ............ *F16M 13/02* (2013.01); *A47F 7/024* (2013.01); *F16M 11/041* (2013.01);
(Continued)

(58) Field of Classification Search
USPC ...... 248/551, 553, 176.1, 178.1, 187.1, 685; 340/568.1, 568.2, 568.8
See application file for complete search history.

(56) References Cited

U.S. PATENT DOCUMENTS

| 4,896,140 A | 1/1990 | Biever et al. |
| 4,973,023 A | 11/1990 | O'Neill |

(Continued)

FOREIGN PATENT DOCUMENTS

| GB | 2 128 790 A | 5/1984 |
| GB | WO2012069816 | 5/2012 |

OTHER PUBLICATIONS

"The Next Generation in Display Security VANTAGE", Se-Kure Controls, Inc. Flyer.
(Continued)

*Primary Examiner* — Bradley Duckworth
(74) *Attorney, Agent, or Firm* — Lempia Summerfield Katz LLC

(57) ABSTRACT

An apparatus, a system and a method secures, attaches and/or detaches a device to a fixture. A post with an interior secures a retractable reel. The retractable reel has a cable that attaches, connects and/or secures the device to the fixture. The cable extends from the retractable reel and/or extends through the post. A head unit attaches to the device and has a fastening mechanism for connecting and/or for disconnecting the cable to the device. The post has a recession for receiving a head unit and/or for aligning the head unit and/or the device. A fastener and/or an adhesive connects, secures and/or attaches the device to the head unit. A key disconnects the cable from the head unit.

20 Claims, 3 Drawing Sheets

(51) Int. Cl.
  *F16M 11/04* (2006.01)
  *F16M 11/22* (2006.01)
  *A47F 7/024* (2006.01)

(52) U.S. Cl.
  CPC ............ *F16M 11/22* (2013.01); *F16M 13/00* (2013.01); *Y10T 29/49826* (2015.01)

(56) References Cited

U.S. PATENT DOCUMENTS

| | | |
|---|---|---|
| 5,066,942 A | 11/1991 | Matsuo |
| 5,072,213 A | 12/1991 | Close |
| 5,124,685 A | 6/1992 | Rankin |
| 5,172,098 A | 12/1992 | Leyden et al. |
| 5,246,183 A | 9/1993 | Leyden |
| 5,552,771 A | 9/1996 | Leyden et al. |
| 5,565,848 A | 10/1996 | Leyden et al. |
| 5,676,258 A | 10/1997 | Leyden et al. |
| 5,861,807 A | 1/1999 | Leyden et al. |
| 6,019,304 A | 2/2000 | Skowronski et al. |
| 6,027,277 A | 2/2000 | Leyden et al. |
| 6,039,498 A | 3/2000 | Leyden et al. |
| 6,087,939 A | 7/2000 | Leyden et al. |
| 6,337,633 B1 | 1/2002 | Foseide |
| RE37,590 E | 3/2002 | Leyden et al. |
| 6,386,906 B1 | 5/2002 | Burke |
| 6,459,374 B1 | 10/2002 | Rand et al. |
| 6,476,717 B1 | 11/2002 | Gross et al. |
| 6,495,756 B1 | 12/2002 | Burke et al. |
| 6,502,727 B1 | 1/2003 | Decoteau |
| 6,756,900 B2 | 6/2004 | Leyden et al. |
| 6,761,579 B2 | 7/2004 | Fort et al. |
| 6,799,994 B2 | 10/2004 | Burke |
| 6,946,961 B2 | 9/2005 | Frederiksen et al. |
| 7,053,774 B2 | 5/2006 | Sedon et al. |
| 7,154,039 B1 | 12/2006 | Marszalek et al. |
| 7,202,417 B2 | 4/2007 | Marszalek et al. |
| 7,202,786 B2 | 4/2007 | Marszalek et al. |
| 7,223,917 B1 | 5/2007 | Marszalek et al. |
| 7,287,652 B2 | 10/2007 | Scholen et al. |
| 7,385,522 B2 | 6/2008 | Belden, Jr. et al. |
| 7,387,003 B2 | 6/2008 | Marszalek et al. |
| 7,487,652 B2 | 2/2009 | Marszalek et al. |
| 7,504,944 B2 | 3/2009 | Marszalek et al. |
| 7,592,548 B2 | 9/2009 | Marszalek et al. |
| 7,593,142 B2 | 9/2009 | Marszalek et al. |
| 7,614,601 B2 | 11/2009 | Marsilio et al. |
| 7,629,895 B2 | 12/2009 | Belden, Jr. et al. |
| 7,714,722 B2 | 5/2010 | Marszalek et al. |
| D616,778 S | 6/2010 | Marszalek et al. |
| 7,971,845 B2 | 7/2011 | Galant |
| 8,674,833 B2 | 3/2014 | Johnston et al. |
| 8,749,194 B1 | 6/2014 | Kelsch et al. |
| 2006/0086160 A1 | 4/2006 | Marszalek et al. |
| 2006/0248781 A1 | 11/2006 | Horvath et al. |
| 2007/0113973 A1 | 5/2007 | Marszalek et al. |
| 2007/0125569 A1 | 6/2007 | Marszalek et al. |
| 2007/0145209 A1 | 6/2007 | Marsili et al. |
| 2007/0169956 A1 | 7/2007 | Marszalek et al. |
| 2007/0194918 A1 | 8/2007 | Rabinowitz et al. |
| 2008/0047178 A1 | 2/2008 | Marszalek et al. |
| 2008/0156959 A1 | 7/2008 | Fawcett et al. |
| 2008/0169923 A1 | 7/2008 | Belden et al. |
| 2008/0204239 A1 | 8/2008 | Marszalek et al. |
| 2009/0058643 A1 | 3/2009 | Groth |
| 2009/0173868 A1 | 7/2009 | Fawcett et al. |
| 2009/0266963 A1 | 10/2009 | Marszalek et al. |
| 2010/0176945 A1 | 7/2010 | Fawcett et al. |
| 2010/0301998 A1 | 12/2010 | Marszalek et al. |
| 2011/0068919 A1 | 3/2011 | Rapp et al. |
| 2011/0068920 A1 | 3/2011 | Yeager et al. |
| 2011/0084689 A1 | 4/2011 | Groth et al. |
| 2011/0084838 A1 | 4/2011 | Fawcett |
| 2011/0303816 A1 | 12/2011 | Horvath et al. |
| 2011/0309934 A1 | 12/2011 | Henson et al. |
| 2012/0019383 A1 | 1/2012 | Fawcett et al. |
| 2012/0188082 A1 | 7/2012 | Berglund et al. |
| 2012/0205326 A1 | 8/2012 | Richter |
| 2012/0241108 A1 | 9/2012 | Marszalek et al. |
| 2014/0106608 A1 | 4/2014 | Howarth et al. |

OTHER PUBLICATIONS

"The Next Generation in Display Security VANTAGE II", Se-Kure Controls, Inc. Flyer.
"Se-Kure Controls: Detailed Descriptions of Items Too New for Catalog", Se-Kure Controls, Inc. Website, http://www.se-kure.com/new_listings.htm.
"Se-Kure Controls: 4-Port and One-on-One Alarms", Se-Kure Controls, Inc. Website, http://www.se-kure.com/page7.htm.
"InVue Security Products USB Sensors", Promotional Flyer.
MTI, FREEDOM™ C, CEhh Merchandising System Version 2.0, Universal Power & Video Switching, pp. 1-30, Nov. 2005.
Freedom LP™ Product Manual, pp. 1-19, Aug. 4, 2009.
Freedom—New Product Development, MTI Copyright 2009.
Freedom Universal 2.0 Product Manual, pp. 1-21, Jul. 2009.
Freedom Universal™ Product Manual, pp. 1-22, Jun. 9, 2006.
Freedom Universal™ Product Manual, pp. 1-21, Sep. 17, 2009.
T-Mobile Freedom LP Product Manual, pp. 1-17, Sep. 25, 2006.

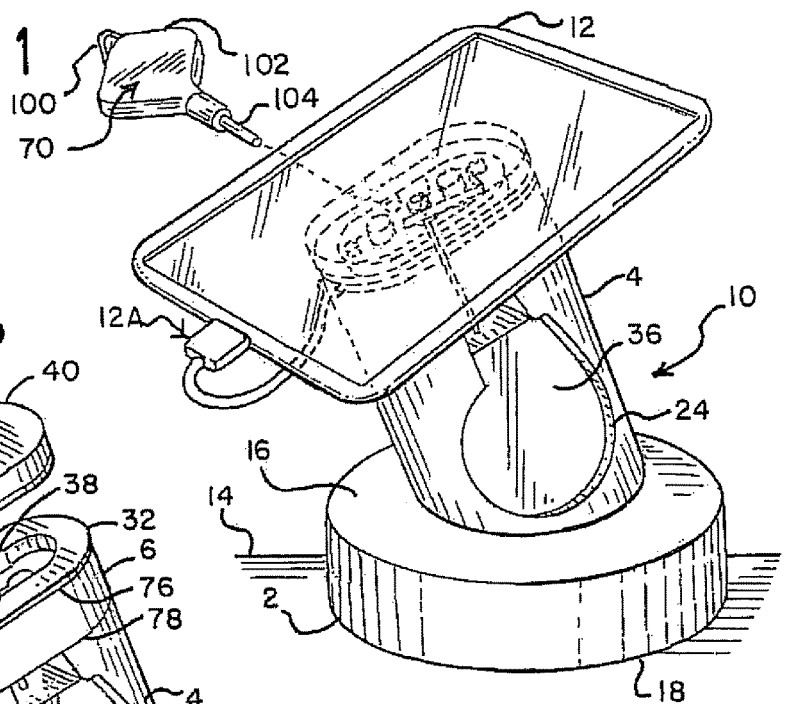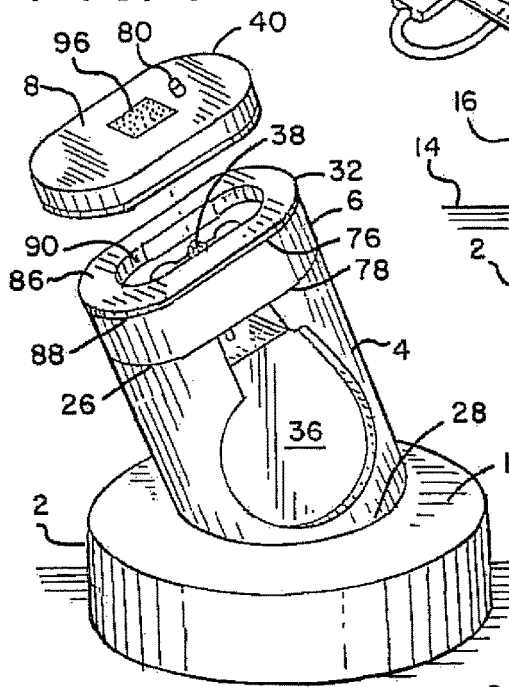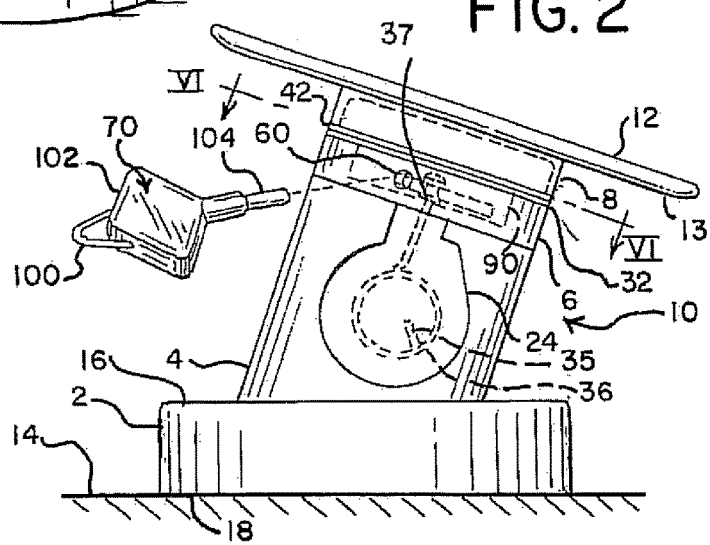

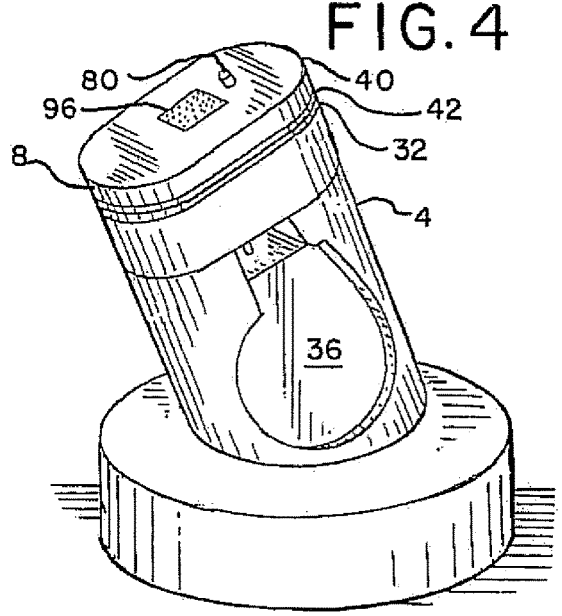
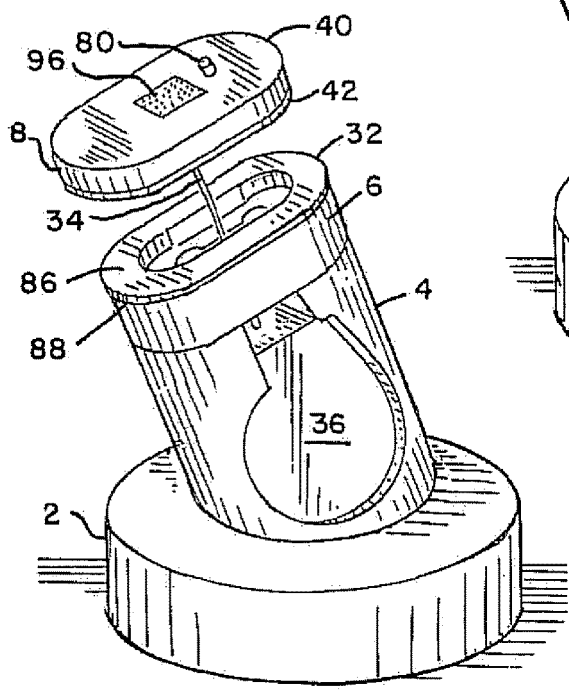
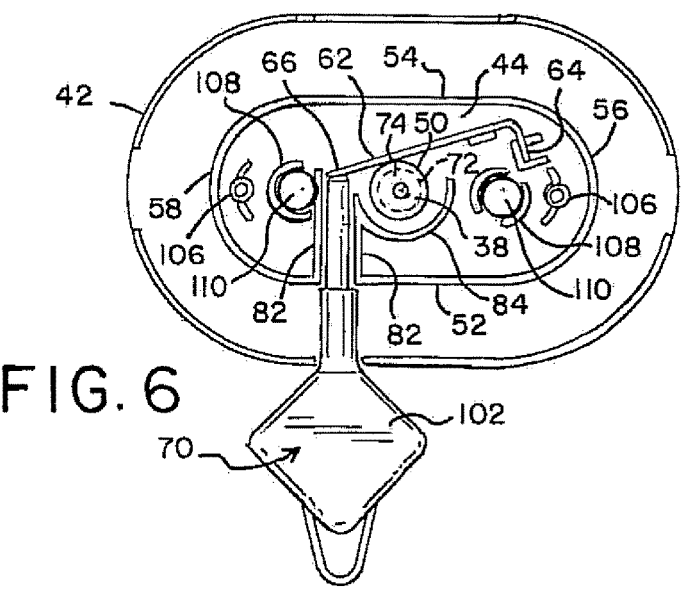

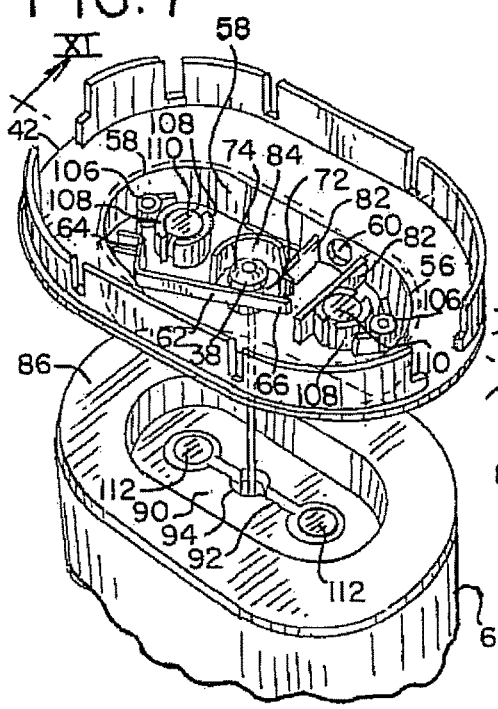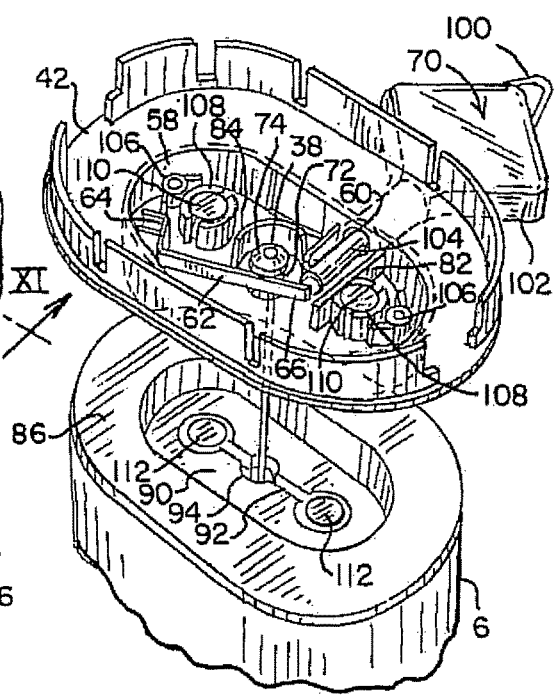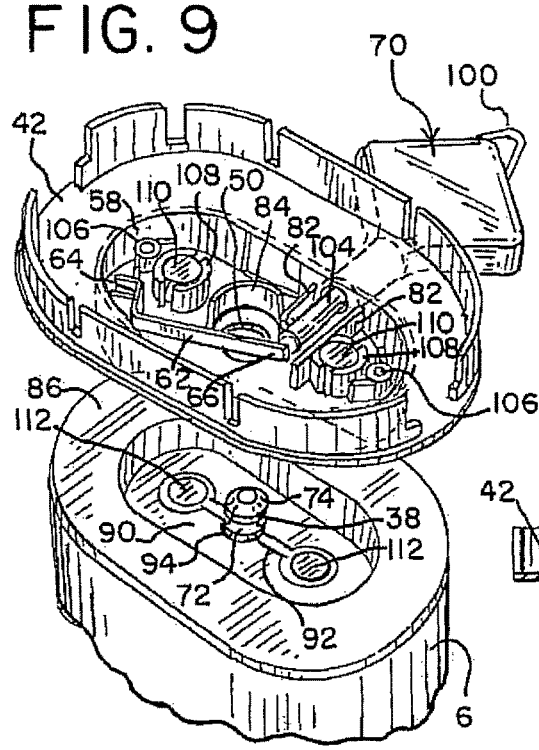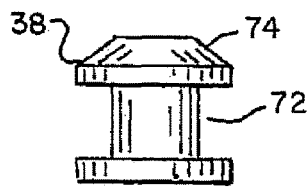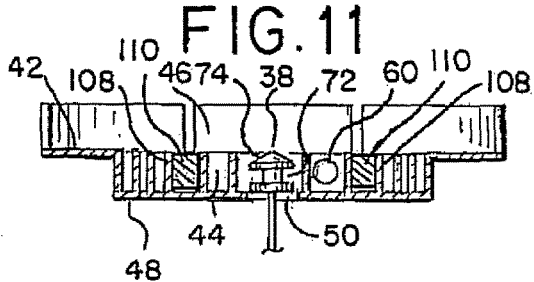

APPARATUS, SYSTEM AND METHOD FOR SECURING, ATTACHING AND/OR DETACHING A DEVICE TO A FIXTURE

CROSS REFERENCE TO RELATED APPLICATIONS

This application is a divisional application of and claims the benefit of U.S. application Ser. No. 13/600,047 filed Aug. 30, 2012.

BACKGROUND OF THE INVENTION

The present invention generally relates to an apparatus, a system and a method for securing, for attaching and/or for detaching a device to a fixture. More specifically, the present invention relates to an apparatus, a system and a method for securing, for attaching and/or for detaching a portable electronic device, such as, for example, a camera, a camcorder, a digital camera, a digital music player, a video game, a digital video player, a digital video recorder, a personal data assistant (hereinafter "a PDA"), a laptop or tablet computer, an E-book, an E-reader, a cellular telephone and/or the like. The apparatus, the system and the method for securing, for attaching and/or for detaching the device may attach the device to the fixture to deter and/or prevent theft and/or destruction of the device. The device may be a portable electronic device which may be, for example, displayed for sale by a retailer, a wholesaler and/or the like.

It is generally known, for example, that vendors, retailers and/or wholesalers may display a device to a customer at, for example, a retail store and/or a sales facility for examination and/or inspection by the customer. The device may be a portable electronic device, such as, for example, a camera, a digital camera, a compact disc player, an MP3 player, a PDA, a laptop or tablet computer, an E-book, an E-reader, a cellular telephone and/or the like. The device is traditionally displayed in conjunction with a fixture, such as, for example, a wall, a floor, a pillar, a support beam, a stair case or a fixture, such as, for example, a cabinet, a table, a shelf and/or the like.

Generally, the device is fixed to a surface of the fixture, and/or a cable attaches the device to the fixture. The cable is often not adjustable or has a limited length. In addition, the cable is often not detachable. As a result, the customer and/or the user is unable to examine the device while being independent of the cable and/or fixture. For example, pulling of the cable often prevents the customer and/or the user from examining the various characteristics of the device, such as, for example, the weight, the feel, and the portability of the device. Further, the attachment of the cable prevents the customer and/or the user from examining the size, weight and/or other dimensions of the device with respect to a laptop bag, a book bag, and/or a pant pocket, for example.

A need, therefore, exists for an apparatus, a system and a method for securing, for attaching and/or for detaching a device to a fixture. Additionally, a need exists for an apparatus, a system and a method for securing, for attaching and/or for detaching a device to a fixture which may allow a device to be detached from the fixture to allow a customer and/or a user to manipulate and/or examine the device. Moreover, a need exists for an apparatus, a system and a method for securing, for attaching and/or for detaching a device to a fixture which may allow a device to be re-attached to a fixture after detachment from the fixture. Further, a need exists for an apparatus, a system and a method for securing, for attaching and/or for detaching a device to a fixture which may provide electrical security to the device while the device is detached from a fixture. Even further, a need exists for an apparatus, a system and a method for securing, for attaching and/or for detaching a device to a fixture which may utilize a retractable reel for retracting a cable. Moreover, a need exists for an apparatus, a system and a method for securing, for attaching and/or for detaching a device to a fixture which may trigger an alarm for a separation of the device from the cable and/or the separation of the device from the apparatus.

SUMMARY OF THE INVENTION

The present invention generally relates to an apparatus, a system and a method for securing, for attaching and/or for detaching a device to a fixture. Examples of devices may include, for example, a camera, a digital camera, a compact disc player, an MP3 player, a PDA, a laptop or tablet computer, an E-book, an E-reader, a cellular telephone and/or the like. Further, the apparatus, the system and the method for securing, for attaching and/or for detaching the device to a fixture may have a base, a cable and a connector for attaching to the device. Moreover, the apparatus, the system and the method for securing, for attaching and/or for detaching the device to a fixture may allow the device to be detached from the fixture.

To this end, in an embodiment of the present invention, an apparatus for securing a device is provided. The apparatus has a post, a connector, a cable, a head unit, a spring and a slot. The cable has a length defined between a first end and a second end. The first end of the cable is attached to the connector. The head unit removably attaches to the post and has an interior compartment with an opening to receive the connector. The interior compartment also has a spring to removably hold the connector. Moreover, the head unit has a slot to provide access to the spring from outside the head unit.

In an embodiment, the apparatus has a key sized for inserting into the slot wherein the key releases the spring from the connector.

In an embodiment, the apparatus has a reel connected to the second end of the cable wherein the reel is attached to the post.

In an embodiment, the apparatus has a groove in the connector wherein the spring is secured in the groove.

In an embodiment, the apparatus has a tip on the connector wherein the tip has a taper.

In an embodiment, the apparatus has a plunger in the head unit wherein the plunger extends through the head unit.

In an embodiment, the apparatus has an adhesive on the head unit.

In an embodiment, the apparatus has a wall extending from the slot toward the spring.

In another embodiment of the present invention, a system for securing a device is provided. The system has a post a cable, a connector and a head unit. The post has an interior and a recession. The cable extends from the interior of the post and through a hole in the recession. The cable is attached to a connector and extends through an opening in the head unit. The head unit is movable from the post.

In an embodiment, the head unit is inserted into the recession.

In an embodiment, the system has a spring in the head unit.

In an embodiment, the system has a plunger extending from the head unit.

In an embodiment, the system has the head unit with an adhesive.

In an embodiment, the system has a key that detaches the head unit from the connector.

In another embodiment of the present invention, a method to attach and to detach a device to a fixture is provided. The method has the step of providing a post having a cable and a connector wherein the post mounts on the fixture. Further, the method connects the head unit to the post with the connector allowing the head unit to attach to a device. Moreover, the method detaches the connector from the head unit to release the device from the post.

In an embodiment, the method has the step of inserting the head unit into the post to connect the head unit to the connector.

In an embodiment, the method has the step of aligning the head unit with respect to the post.

In an embodiment, the method has the step of aligning the connector with respect to the head unit.

In an embodiment, the method has the step of providing a spring to removably secure the connector to the connector.

In an embodiment, the method has the step of providing a key to detach the connector from the head unit.

It is, therefore, an advantage of the present invention to provide an apparatus, a system and a method for securing, for attaching and/or for detaching a device to a fixture.

Another advantage of the present invention is to provide an apparatus, a system and a method for securing, for attaching and/or for detaching a device to a fixture which may be utilized to prevent theft of and/or destruction of the device.

And, another advantage of the present invention is to provide an apparatus, a system and a method for securing, for attaching and/or for detaching a device to a fixture which may allow the device to be moved with respect to the fixture which may allow the device to be manipulated and/or to be examined by a user.

Yet another advantage of the present invention is to provide an apparatus, a system and a method for securing, for attaching and/or for detaching a device to a fixture which may allow a user to detach the device from a fixture to examine characteristics of the device and/or to manipulate the device.

A further advantage of the present invention is to provide an apparatus, a system and a method for securing, for attaching and/or for detaching a device to a fixture which may allow a device to be re-attached to a fixture after detachment from the fixture.

Moreover, an advantage of the present invention is to provide an apparatus, a system and a method for securing, for attaching and/or for detaching a device to a fixture which may allow a user to remove the device from a fixture to examine characteristics of the device and/or to manipulate the device without detaching the device from the fixture.

Another advantage of the present invention is to provide an apparatus, a system and a method for securing, for attaching and/or for detaching a device to a fixture which may provide a post for displaying, for connecting and/or for attaching the device to a fixture.

And, another advantage of the present invention is to provide an apparatus, a system and a method for securing, for attaching and/or for detaching a device to a fixture which may provide a head unit attachable to the device and/or a cable of a retractable reel for securing, for attaching and/or for connecting the device to a fixture.

Yet another advantage of the present invention is to provide an apparatus, a system and a method for securing, for attaching and/or for detaching a device to a fixture which may provide a fastening mechanism within a head unit to allow a device to be attached and/or detached from the fixture.

A still further advantage of the present invention is to provide an apparatus, a system and a method for securing, for attaching and/or for detaching a device to a fixture which may provide a slot within a head unit for providing access to the fastening mechanism from outside the head unit.

Another advantage of the present invention is to provide an apparatus, a system and a method for securing, for attaching and/or for detaching a device to a fixture which may provide a key to detach the device from the fixture.

And, another advantage of the present invention is to provide an apparatus, a system and a method for securing, for attaching and/or for detaching a device to a fixture which may align the head unit with respect to the post.

Yet another advantage of the present invention is to provide an apparatus, a system and a method for securing, for attaching and/or for detaching a device to a fixture with an adhesive for connecting the device to the head unit.

A further advantage of the present invention is to provide an apparatus, a system and a method for securing, for attaching and/or for detaching a device to a fixture with reduced friction and/or increased longevity of a cable.

A still further advantage of the present invention is to provide an apparatus, a system and a method for securing, for attaching and/or for detaching a device to a fixture which may provide electrical security to the device.

Moreover, another advantage of the present invention is to provide an apparatus, a system and a method for securing, for attaching and/or for detaching a device to a fixture which allows detachment of the device from the fixture and electrical security to the device.

Additional features and advantages of the present invention are described in, and will be apparent from, the detailed description of the presently preferred embodiments and from the drawings.

BRIEF DESCRIPTION OF THE DRAWINGS

FIG. 1 is a perspective view of a device mounted to a system in an embodiment of the present invention.

FIG. 2 is a side view of the device attached to a system in an embodiment of the present invention.

FIG. 3 is a perspective view of the device showing the head unit detached from the cable and the post.

FIG. 4 is a perspective view of the device showing the head unit inserted into the post.

FIG. 5 is a perspective view of the device showing the head unit extending from the post.

FIG. 6 is a cross-sectional view of the head unit taken generally along line VI-VI of FIG. 2 in an embodiment of the present invention.

FIG. 7 is a perspective view of the interior cavity of the head unit showing the anchor attached to the spring.

FIG. 8 is a perspective view of the interior cavity of the head unit showing the key releasing the spring from the anchor.

FIG. 9 is a perspective view of the interior cavity of the head unit showing the anchor detached from the spring.

FIG. 10 is a side view of the anchor.

FIG. 11 is a cross-sectional view of the interior cavity of the head unit taken generally along line XI-XI of FIG. 7 in an embodiment of the present invention.

DETAILED DESCRIPTION OF THE PRESENTLY PREFERRED EMBODIMENTS

The present invention generally relates to an apparatus, a system and a method for securing, for attaching and/or for detaching a device to a fixture. The apparatus, the system and the method may attach, may connect and/or may secure the device to a fixture via a base, a post, a crown, a head unit and/or a cable. The head unit may have an adhesive for connecting, for attaching and/or for securing the device to the head unit. The post may have a retractable reel to attach, to connect and/or to secure the device to the cable, to the post, to the base and/or to the fixture, respectively. The retractable reel may allow the cable to be pulled, to be moved and/or to be extendable with respect to the fixture and/or the post. The cable may extend with respect to the retractable reel, the post and/or the exterior surface of the fixture. The cable may have an anchor for connecting, for attaching and/or for securing the head unit to the cable. Furthermore, the head unit may have a spring for attaching and/or detaching the head unit from the cable. The device may attach and/or detach from the fixture, the base and the post such that a customer and/or a user may manipulate and/or examine the device.

Referring now to the drawings wherein like numerals refer to like parts, FIGS. 1 and 2 illustrate an apparatus 10 which may secure a device 12 to a fixture 14 in an embodiment of the present invention. The apparatus 10 may have a base 2, a post 4, a crown 6, a head unit 8, a cap 32, a retractable reel 36 and a key 70. The retractable reel 36 may have a cable 34 which may be pulled, moved and/or extended with respect to the retractable reel 36. The device 12 may be a portable electronic device, such as, for example, a camera, a camcorder, a digital camera, a digital music player, a video game, a digital video player, a digital video recorder, a PDA, a laptop or tablet computer, an E-book, an E-reader, a cellular telephone and/or the like. Further, the device 12 may have an underside 13 for securing the device 12 to the head unit 8.

As illustrated in FIGS. 1 and 2, the base 2, the post 4, the crown 6, the head unit 8, the cap 32 and/or the retractable reel 36 may be constructed from a material, such as, for example, a plastic, a thermoplastic, a silicone, a rubber, a metal and/or the like and/or any combination thereof. It should be understood that the base 2, the post 4, the crown 6, the head unit 8, the cap 32 and/or the retractable reel 36 may be constructed from any material as known to one having ordinary skill in the art. The cable 34 may be made from a material, such as, for example, steel and/or the like.

The base 2 may have a top end 16 and/or a bottom end 18. The bottom end 18 may be located at a position opposite to the top end 16. The base 2 may attach to and/or may mount to a fixture 14. The fixture 14 may be a wall, a floor, a pillar, a support beam, a stair case or a fixture, such as, for example, a cabinet, a table, a shelf and/or the like. The present invention should not be deemed as limited to the embodiments of a specific structural element and/or a specific fixture 14. The bottom end 18 of the base 2 may be fastened to the fixture 14 by screws, adhesive, cable and/or the like. It should be understood that the base 2 may be fastened by any type of fastener and/or any number of fasteners as known to one of ordinary skill in the art.

The post 4 may attach to the base 2. The post 4 may have a top wall 26 and/or a bottom wall 28 wherein the bottom wall 28 is located at a position opposite to the top wall 26. The bottom wall 28 of the post 4 may attach to the top end 16 of the base 2. The post 4 may fasten to the base 2 by screws, retaining clips, adhesive and/or the like. It should be understood that the post 4 may fasten to the base 2 by any type of fastener and/or any number of fasteners as known to one of ordinary skill in the art.

As shown in FIGS. 1 and 2, the retractable reel 36 may be located within a compartment 24 of the post 4. The retractable reel 36 may allow the cable 34 to extend and/or retract with respect to the base 2, the post 4, the crown 6 and the fixture 14. The retractable reel 36 and the cable 34 may allow the device 12 to be manipulated and/or to be examined away from the fixture by a customer and/or a user. The retractable reel 36 may attach to, fasten to, and/or connect to the post 4. As a result, the cable 34 may attach to, fasten to, and/or connect to the fixture 14. The retractable reel 36 may be a spring and pulley, a spring tether, an elastic cable and/or the like. The present invention should not be deemed as limited to the embodiments of a specific structural element and/or a specific cable retractor 36.

As illustrated in FIGS. 2 and 5, the cable 34 may extend through the post 4 and the crown 6 and may exit through the cap 32. The cable 34 may have a length defined by a first end 35 and a second end 37. The first end 35 of the cable 34 may be located at a position opposite to the second end 37. The first end 35 may attach to the base 2, the post 4, the crown 6 and the fixture 14 through the retractable reel 36. The second end 37 may attach to an anchor 38.

As illustrated in FIGS. 2, 7 and 8, the anchor 38 may be press-fit or bonded to the second end 37 to fasten the second end 37 to the cable 34. The anchor 38 may be made from a material, such as, for example, steel and/or the like. As illustrated in FIG. 10, the anchor 38 may have a groove 74 that may be located circumferentially around the anchor 38 and in a direction perpendicular to the cable 34. Also, the anchor 38 may have a tapered tip 74. The tapered tip 74 may extend in a direction away from and/or parallel to the cable 34. The anchor 38 may be made from a material, such as, for example, steel and/or the like.

FIGS. 1-5 generally illustrate the crown 6 that may be attached to the post 4. The crown 6 may have an upper end 76 and/or a lower end 78. The lower end 78 may be positioned at a location opposite to the upper end 76. The lower end 78 of the crown 6 may be fastened to the top wall 26 of the post 4. The crown 6 may be fastened to the post 4 by screws, retaining clips, adhesive and/or the like. The crown 6 may be hollow to allow the cable 34 to travel through the crown 6.

As illustrated in FIG. 3, the cap 32 may attach to the upper end 76 of the crown 6. The cap 32 may have an upper side 86 and/or a lower side 88. The lower side 88 may be positioned at a location opposite to the upper wall 86. The lower side 88 of the cap 32 may be fastened to the upper end 76 of the crown 6. The cap 32 may fasten to the crown 6 by, for example, screws, retaining clips, adhesive and/or the like.

As illustrated in FIGS. 1-3, 5 and 7-9, the cap 32 may have a recession 90 which may extend inward with respect to the upper side 86 of the cap 32. The recession 90 may be sized to receive the head unit 8 for displaying the device 12. A slit 92 and/or a hole 94 may be formed in the cap 32 and may extend through the cap 32. The hole 94 may be centered with respect to the cap 32 and the recession 90. The slit 92 and/or the hole 94 may be sized to allow the cable 34 to travel through the slit 92 and/or the hole 94. The slit 92 and/or the hole 94 may be sized to prevent friction between the cable 34 and/or the cap 32 and may allow the cable 34 to travel that may increase the longevity of the cable 34.

Further, the hole 94 may be sized to prevent the anchor 38 from retracting through the cap 32 and into the retractable reel 36.

As illustrated in FIGS. 3-5, the head unit 8 may have a top cover 40 and/or a bottom cover 42. The bottom cover 42 may be located at a position opposite to the top cover 40. The top cover 40 may attach to the device 12. The top cover 40 of the head unit 8 may have, for example, an adhesive 96 that may attach the top cover 40 to the device 12. The present invention should not be deemed as limited to a specific embodiment of the material of the adhesive 96. It should be understood that the adhesive 96 may be any adhesive as known to one having ordinary skill in the art.

The head unit 8 may have a plunger 80. The plunger 80 may be connected to a printed circuit board (not shown and hereinafter "PCB") to detect the attachment of the head unit 8 to the device 12. The plunger 80 may extend through the top cover 40 and may contact the underside 13 of the device 12. The plunger 80 may be depressed by the device 12 when the head unit 8 is attached to the device 12. The PCB may monitor the attachment of the head unit 8 to the device with the plunger 80. The PCB may be housed within the head unit 8. In addition, the PCB may be wirelessly connected to and/or in communication with an alarm box (not shown) to provide electrical security to the device 12. As a result, an unauthorized separation of the device 12 from the head unit 8 may cause the PCB to activate the alarm box and trigger an audible alarm. Further, an unauthorized separation of the head unit 8 or the device 12 from the power cable 12A may also trigger an audible alarm. The power cable 12A may also be used to provide power to the device 12 and/or to charge the device 12.

As illustrated in FIG. 11, the bottom cover 42 may have a top side 46 and/or a bottom side 48. The bottom side 48 may be positioned at a location opposite to the top side 46. The bottom side 48 of the bottom cover 42 may be sized and/or shaped to insert into the recession 90 of the cap 32. The shape of the recession 90 may substantially match the shape of the bottom side 48 of the bottom cover 42. The bottom side 48 may have, for example, a circular shape, an oval shape and/or the like. It should be understood that the shape of the bottom side 48 of the bottom cover 42 may be any shape as known to one of ordinary skill in the art.

As illustrated in FIGS. 6, 9 and 11, the bottom cover 42 may have an interior cavity 44 defined by the bottom side 28, a first flat sidewall 52, a second flat sidewall 54, a first round sidewall 56 and a second round sidewall 58. The first flat sidewall 52 is positioned at a location opposite to the second flat sidewall 54. The first round sidewall 56 is positioned at a location opposite to the second round sidewall 58. The bottom cover 42 may have an opening 50 which may extend through the bottom side 28 and into the interior cavity 44. The opening 50 may be centered with respect to the head unit 8 and the bottom cover 42. The opening 50 may also have a guide 84 surrounding a portion of the opening 50.

As illustrated in FIGS. 6-9 and 11, the interior cavity 44 may have head unit magnets 110 secured by retainers 108 to the bottom side 48 of the bottom cover 42. The crown 6 may have crown magnets 112 positioned at the upper end 76. The head unit magnets 110 may engage the crown magnets 112 to retain the head unit 8 within the recession 90.

The interior cavity 44 may also have bosses 106 attached to the bottom side 48 of the bottom cover 42. Fasteners (not shown) may engaged the bosses 106 to attach the PCB over the interior cavity 44 of the bottom cover 42. In addition, the guide 84, the bosses 106, the retainers 108 and the head unit magnets 110 may have a similar height to allow the PCB to be positioned a distance above the bottom side 48 and also supported by the guide 84, the bosses 106, the retainers 108 and the head unit magnets 110.

The bottom cover 42 may have a spring 62 located within the interior cavity 44. The spring 62 may have a first end 64 and/or a second end 66. The second end 66 is positioned at a location opposite to the first end 64. The first end 64 of the spring 62 may attach to the bottom side 28 and/or the second flat sidewall 54 of the bottom cover 42. The second end 66 of the spring 62 may extend in a direction toward the opening 50 and the first flat sidewall 52. The second end 66 may extend to a point beyond the opening 50 to allow a portion of the spring 62 to overlap a portion of the opening 50.

The spring 62 may attach the cable 34 to the head unit 8. When connecting the cable 34 to the head unit 8, the anchor 38 may be inserted into the opening 50. The anchor 38 may be positioned within the opening 50 to allow the spring 62 to rest within the groove 72 of the anchor 38. The overlapping relationship of the spring 62 with the opening 50 may allow the spring 62 to attach to the anchor 38. The tapered tip 74 of the anchor 38 may gradually deflect the spring 62 away from the first flat sidewall 52 as the anchor 38 travels through the opening 50. The deflection of the spring 62 may increase until the groove 72 is located at a position beside the spring 62. The decreased diameter of the groove 72 may cause a decrease in the deflection of the spring 62, and the spring may come to rest within the groove 72. The spring 62 may remain within the groove 72 to allow the head unit 8 to attach to the cable 34. The guide 84 may also support the anchor 38 to ensure the spring 62 remains engaged within the groove 72.

As illustrated in FIGS. 1, 2 and 6-9, the bottom cover 42 may have a keyhole 60 that may be sized to receive the key 70. The keyhole 60 may extend through the first flat sidewall 52 and in a direction toward the spring 62. It should be understood to one having ordinary skill in the art that the position of the keyhole 60 is not limited to a position located within the first flat sidewall 52. The keyhole 60 may be located within any wall of the interior cavity 44. Further, the keyhole 60 is not limited to providing access to only the second end 66 of the spring 62. The keyhole 60 may be positioned to provide access to any portion of the spring 62 by the key 70.

The keyhole 60 may have vertical guide walls 82 extending from the keyhole 60 and toward the spring 62. The vertical guide walls 82 may be attached to the first flat sidewall 52, the bottom side 48 of the bottom cover 42 and/or the guide 84. The vertical guide walls 82 may provide access to the spring 62.

The key 70 may have a key ring 100, a handle 102 and a barrel pin 104. The key ring 100 may allow the key 70 to be carried by a retail store employee. The key ring 100 and the handle 102 may be made from a material, such as, for example, a plastic, a thermoplastic, a silicone, a rubber, a metal and/or the like and/or any combination thereof. The barrel pin 104 may be a male 3.5 millimeter Tip-Ring-Sleeve ("TRS") connector as generally known to one having ordinary skill in the art. The barrel pin 104 may be a mono or stereo TRS connector. Further, the barrel pin 104 may be made from a material, such as, for example, steel, silver, gold and/or the like. It should be understood that the size, the shape and/or the diameter of the key ring 100, the handle 102 and/or the barrel pin 104 may be any size, shape and/or diameter as known to one of ordinary skill in the art.

The key 70 may be used to detach the cable 34 from the head unit 8. The key 70 may be inserted into the keyhole 60 and/or may be guided by the vertical guide walls 82 to ensure the key 70 may contact the second end 66 of the spring 62. As a result, the key 70 may deflect the spring 62 in a direction away from the opening 50. The key 70 may deflect the spring until the spring 62 is no longer located in a position overlapping the opening 50 and/or in contact with the anchor 38 and/or the groove 72.

After the cable 34 has been detached from the head unit 8, the customer and/or the user may manipulate and/or examine the device 12 without the tension of the cable 34 and/or the retractable reel 36 that may pull the device 12 towards the fixture 14. Although the mechanical security has been removed, electronic security may still be provided to the device 12 by the PCB and/or the alarm box to prevent tampering and/or theft of the device 12.

The retractable reel 36 may retract cable 34 into the post 4 after the cable 34 has been detached from the head unit 8. The anchor 38 may come to rest above the slit 92 and/or the hole 94 to center the anchor 38 with respect to the recession 90, as shown in FIG. 9.

The customer and/or the user may re-attach the head unit 8 and/or the device 12 when finished manipulating and/or examining the device 12. The head unit 8 and/or the device 12 may be re-attached to the cable 34 and anchor 38 by inserting the bottom side 48 of the head unit 8 into the recession 90 of the cap 32. The anchor 38 centered with respect to the recession 90 may be aligned with the opening 50 within the bottom side 48 of the head unit 8. Therefore, the anchor 38 may enter the opening 50 when inserting the bottom side 48 of the head unit 8 into the recession 90. As a result, the spring 62 may engage the anchor 38 to reattach the head unit 8 to the cable 34.

The customer and/or the user may also inspect, manipulate and/or examine the device 12 with the cable 34 attached. The retractable reel 36 may allow the cable 34 to be pulled, moved and/or extended with respect to the fixture 14 to allow the device to move a distance from the fixture 14. After the customer and/or the user has finished inspecting, manipulating and/or examining the device 12, the retractable reel 36 may retract the cable 34 to pull the head unit 8 and/or the device 12 towards the post 4. The retractable reel 36 may continue pulling the head unit 8 and/or the device 12 until the bottom side 48 of the head unit 8 is inserted into the recession 90 of the cap 32. As a result, the device 12 may be inspected, manipulated and/or examined by the next customer and/or user.

In an alternative embodiment, the key 70 may be used to silence an audible siren. The key 70 and barrel tip 104 may be inserted into the alarm box to silence the audible siren. In addition, the key 70 may have an embedded microchip (not shown) in communication with the barrel tip 104. When inserted into the alarm box, the barrel tip 104 may allow the exchange of information between the microchip and the alarm box. The microchip may store and communicate alarm information and configuration settings.

In yet another embodiment, the post 4 may attach directly to the fixture 14. The bottom wall 28 of the post 4 may fasten to the fixture 14 by screws, adhesive, cable and/or the like. It should be understood that the post 4 may be fastened by any type of fastener and/or any number of fasteners as known to one of ordinary skill in the art.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method for removably securing a device to a fixture, the method comprising:
    providing a post having a cable and a connector, wherein the post mounts on the fixture;
    connecting a head unit to the post with the connector, wherein the head unit has an opening through which the cable extends, wherein the head unit houses a spring arranged to assist in attaching the cable to the head unit, and wherein the head unit attaches to the device;
    inserting a key into the head unit to allow for removal of the cable from the head unit; and
    detaching the connector from the head unit to release the device from the post.

2. The method of claim 1 further comprising the step of:
    inserting the head unit into the post to connect the head unit to the connector.

3. The method of claim 1 further comprising the step of:
    aligning the head unit with respect to the post.

4. The method of claim 1 further comprising the step of:
    aligning the connector in the head unit.

5. The method of claim 1 further comprising the step of:
    positioning the connector near the opening of the head unit to secure the cable to the head unit.

6. The method of claim 1 further comprising the step of:
    displacing the spring from the opening to remove the cable from the head unit.

7. The method of claim 1 further comprising the step of:
    extending or retracting the cable with respect to the fixture via a reel holding the cable housed within the post.

8. The method of claim 1 further comprising the step of:
    providing an adhesive on the head unit to adhere the device to the head unit.

9. A method for removably securing a device to a fixture, the method comprising the steps of:
    attaching a post to the fixture, the post having a crown and a cable, the cable coiled around a reel in the post, the cable extending from the reel;
    securing a head unit to the post by the cable through an opening in the head unit wherein the head unit encloses a spring and a printed circuit board ("PCB") and further wherein the PCB wirelessly communicates with an alarm to provide electrical security to the device; and
    inserting a key into a corresponding keyhole in the head unit to move the spring to detach the cable from the head unit.

10. The method of claim 9 further comprising the step of:
    triggering, by the PCB, an audible alarm in response to an unauthorized separation of the device from the head unit.

11. The method of claim 9 further comprising the step of:
    connecting a power cord to the device wherein unauthorized separation of the device from the power cord triggers an audible alarm.

12. The method of claim 9 further comprising the step of:
    monitoring the attachment of the head unit to the device by the PCB.

13. The method of claim 9 further comprising the step of:
    displaying the device on the head unit, wherein a recession in the crown receives the head unit.

14. A system for securing a device to a fixture, the system comprising:
    a base, wherein the base mounts to the fixture;

a post attached to the base, the post extending from the base;

a retractable reel in the post, the retractable reel connected to a cable to retract or extend the cable relative to the fixture;

a crown with a recession formed therein, wherein the crown is attached to the post and wherein the cable extends through the crown; and a head unit connected to the cable, wherein the head unit attaches to the device and wherein the head unit is removable from the post and the head unit houses a printed circuit board ("PCB") configured to monitor attachment of the head unit to the device, wherein the PCB is configured for wireless communication with an alarm box to provide electrical security to the device, and wherein the head unit houses a spring which assists in attachment of the cable to the head unit.

15. The system of claim 14 wherein the recession in the crown is configured to receive at least part of the head unit for displaying the device.

16. The system of claim 14 wherein the spring is configured to detach the cable from the head unit.

17. The system of claim 14 further comprising:

a plunger extending from the head unit, wherein the plunger is configured to be depressed by the device when the head unit is attached to the device.

18. The system of claim 14 further comprising:

an adhesive on the head unit configured to assist in attaching the device to the head unit.

19. The system of claim 14 further comprising:

a power cable configured to be connected to the device, wherein unauthorized separation of the power cable from the device is configured to trigger an audible alarm.

20. The system of claim 14 further comprising:

a power cable configured to be connected to the device to provide power to charge the device.

* * * * *

UNITED STATES PATENT AND TRADEMARK OFFICE
CERTIFICATE OF CORRECTION

PATENT NO. : 9,664,336 B2  
APPLICATION NO. : 15/051802  
DATED : May 30, 2017  
INVENTOR(S) : John E. Ewen, III, Andy G. Reynolds and James Groth Page 1 of 1

It is certified that error appears in the above-identified patent and that said Letters Patent is hereby corrected as shown below:

On the Title Page

At item (72), "Inventors: John E. Ewen, III, Aurora, IL (US); Andy G. Reynolds, Aurora, IL (US); James Groth, Poplar Grove, IL (US)" should be replaced with --Inventors: John E. Ewen, III, Aurora, IL (US); Andy G. Reynolds, Aurora, IL (US); James Groth, Poplar Grove, IL (US); Bjarne Frederiksen, Lombard, IL (US).--

Signed and Sealed this  
Twelfth Day of February, 2019

Andrei Iancu  
*Director of the United States Patent and Trademark Office*

(12) INTER PARTES REVIEW CERTIFICATE (2225th)
United States Patent
Ewen, III et al.

(10) Number: US 9,664,336 K1
(45) Certificate Issued: Jul. 28, 2021

(54) APPARATUS, SYSTEM AND METHOD FOR SECURING, ATTACHING AND/OR DETACHING A DEVICE TO A FIXTURE

(71) Applicant: Sennco Solutions, Inc.

(72) Inventors: John E. Ewen, III; Andy G. Reynolds; James Groth

(73) Assignee: Sennco Solutions, Inc.

Trial Number:

IPR2018-01218 filed Jun. 6, 2018

Inter Partes Review Certificate for:

Patent No.: 9,664,336
Issued: May 30, 2017
Appl. No.: 15/051,802
Filed: Feb. 24, 2016

The results of IPR2018-01218 are reflected in this inter partes review certificate under 35 U.S.C. 318(b).

INTER PARTES REVIEW CERTIFICATE
U.S. Patent 9,664,336 K1
Trial No. IPR2018-01218
Certificate Issued Jul. 28, 2021

AS A RESULT OF THE INTER PARTES REVIEW PROCEEDING, IT HAS BEEN DETERMINED THAT:

Claims 1 and 3-20 are cancelled.

21. (substitute for claim 1) A method for removably securing a device to a fixture, the method comprising:
  providing a post having a cable and a connector, wherein the post mounts on the fixture;
  connecting a head unit to the post with the connector, wherein the head unit has an opening through which the cable extends, wherein the head unit houses a spring arranged to assist in attaching the cable to the head unit, and wherein the head unit attaches to the device;
  inserting the head unit into the post to connect the head unit to the connector;
  inserting a key into the head unit to allow for removal of the cable from the head unit; and
  detaching the connector from the head unit to release the device from the post.

22. (substitute for claim 3) The method of claim 21 further comprising the step of:
  aligning the head unit with respect to the post.

23. (substitute for claim 4) The method of claim 21 further comprising the step of:
  aligning the connector in the head unit.

24. (substitute for claim 5) The method of claim 21 further comprising the step of:
  positioning the connector near the opening of the head unit to secure the cable to the head unit.

25. (substitute for claim 6) The method of claim 21 further comprising the step of:
  displacing the spring from the opening to remove the cable from the head unit.

26. (substitute for claim 7) The method of claim 21 further comprising the step of:
  extending or retracting the cable with respect to the fixture via a reel holding the cable housed within the post.

27. (substitute for claim 8) The method of claim 21 further comprising the step of:
  providing an adhesive on the head unit to adhere the device to the head unit.

28. (substitute for claim 9) A method for removably securing a device to a fixture, the method comprising the steps of:
  attaching a post to the fixture, the post having a crown and a cable, the cable coiled around a reel in the post, the cable extending from the reel;
  securing a head unit to the post by the cable through an opening in the head unit wherein the head unit encloses a spring and a printed circuit board ("PCB") and further wherein the PCB wirelessly communicates with an alarm to provide electrical security to the device;
  inserting the head unit into the post to connect the head unit to a connector of the cable; and
  inserting a key into a corresponding keyhole in the head unit to move the spring to detach the cable from the head unit.

29. (substitute for claim 10) The method of claim 28 further comprising the step of:
  triggering, by the PCB, an audible alarm in response to an unauthorized separation of the device from the head unit.

30. (substitute for claim 11) The method of claim 28 further comprising the step of:
  connecting a power cord to the device wherein unauthorized separation of the device from the power cord triggers an audible alarm.

31. (substitute for claim 12) The method of claim 28 further comprising the step of:
  monitoring the attachment of the head unit to the device by the PCB.

32. (substitute for claim 13) The method of claim 28 further comprising the step of:
  displaying the device on the head unit, wherein a recession in the crown receives the head unit.

33. (substitute for claim 14) A system for securing a device to a fixture, the system comprising:
  a base, wherein the base mounts to the fixture;
  a post attached to the base, the post extending from the base;
  a retractable reel in the post, the retractable reel connected to a cable to retract or extend the cable relative to the fixture;
  a crown with a recession formed therein, wherein the crown is attached to the post and wherein the cable extends through the crown; and
  a head unit connected to the cable, wherein the head unit attaches to the device and wherein the head unit is removable from the post and the head unit houses a printed circuit board ("PCB") configured to monitor attachment of the head unit to the device, wherein the PCB is configured for wireless communication with an alarm box to provide electrical security to the device, wherein the head unit inserts into the post to connect the head unit to a connector of the cable, and wherein the head unit houses a spring which assists in attachment of the cable to the head unit.

34. (substitute for claim 15) The system of claim 33 wherein the recession in the crown is configured to receive at least part of the head unit for displaying the device.

35. (substitute for claim 16) The system of claim 33 wherein the spring is configured to detach the cable from the head unit.

36. (substitute for claim 17) The system of claim 33 further comprising:
  a plunger extending from the head unit, wherein the plunger is configured to be depressed by the device when the head unit is attached to the device.

37. (substitute for claim 18) The system of claim 33 further comprising:
  an adhesive on the head unit configured to assist in attaching the device to the head unit.

38. (substitute for claim 19) The system of claim 33 further comprising:
  a power cable configured to be connected to the device, wherein unauthorized separation of the power cable from the device is configured to trigger an audible alarm.

39. (substitute for claim 20) The system of claim 33 further comprising:
  a power cable configured to be connected to the device to provide power to charge the device.

\* \* \* \* \*